US012640110B2

(12) United States Patent
Seo et al.

(10) Patent No.: US 12,640,110 B2
(45) Date of Patent: May 26, 2026

(54) APPARATUS FOR COMPENSATING VIEWING ANGLE OF DISPLAY DEVICE AND METHOD THEREOF

(71) Applicant: LX SEMICON CO., LTD., Daejeon (KR)

(72) Inventors: Ji Min Seo, Daejeon (KR); Seul Gi Lee, Daejeon (KR); Jun Young Park, Daejeon (KR); Min Ji Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 19/001,720

(22) Filed: Dec. 26, 2024

(65) Prior Publication Data

US 2025/0210004 A1 Jun. 26, 2025

(30) Foreign Application Priority Data

Dec. 26, 2023 (KR) ........................ 10-2023-0191155

(51) Int. Cl.
*G09G 3/36* (2006.01)

(52) U.S. Cl.
CPC ... *G09G 3/3607* (2013.01); *G09G 2320/0233* (2013.01); *G09G 2320/0271* (2013.01); *G09G 2320/0285* (2013.01); *G09G 2320/068* (2013.01); *G09G 2360/16* (2013.01)

(58) Field of Classification Search
CPC ..... G09G 2320/0233; G09G 2320/028; G09G 2320/0285
See application file for complete search history.

(56) References Cited

U.S. PATENT DOCUMENTS

| | | | | |
|---|---|---|---|---|
| 11,929,041 B1 * | 3/2024 | Huang | ................. | G09G 3/3413 |
| 2019/0132568 A1 * | 5/2019 | Ko | ....................... | H04N 1/6005 |
| 2023/0222982 A1 * | 7/2023 | An | ....................... | G09G 3/3275 345/204 |
| 2024/0127766 A1 * | 4/2024 | Zhang | .................. | G09G 3/3614 |
| 2024/0331613 A1 * | 10/2024 | Kim | ......................... | G09G 3/32 |
| 2025/0095562 A1 * | 3/2025 | Bai | ......................... | G06F 3/147 |

FOREIGN PATENT DOCUMENTS

| | | |
|---|---|---|
| KR | 10-0188124 B1 | 6/1999 |

* cited by examiner

*Primary Examiner* — Van N Chow
(74) *Attorney, Agent, or Firm* — POLSINELLI PC

(57) ABSTRACT

An apparatus for compensating a viewing angle of a display device includes a first processer configured to calculate target information by applying a weight to target luminance for each pixel of a display panel and generate at least one lookup table based on the target information; and a second processor configured to calculate, for each pixel of the display panel, a target luminance value corresponding to an input image data input to the display panel by referring to the at least one lookup table, calculate a first luminance difference value between the luminance of the input image data and the target luminance, and supply a second luminance difference value calculated by applying a gain to the luminance difference value to each pixel of the display panel.

18 Claims, 10 Drawing Sheets

| | R | G | B |
|---|---|---|---|
| 0 | 0 | 0 | 0 |
| 1 | 35 | 12 | 6 |
| x | a | b | c |

[LUT_H]

| | R | G | B |
|---|---|---|---|
| 0 | 0 | 0 | 0 |
| 1 | 0 | 1 | 0 |
| x | a' | b' | c' |

[LUT_L]

APPARATUS FOR COMPENSATING VIEWING ANGLE OF DISPLAY DEVICE AND METHOD THEREOF

CROSS-REFERENCE TO RELATED APPLICATION

This application claims the priority of Korean Patent Application No. 10-2023-0191155, filed Dec. 26, 2023, which is hereby incorporated by reference in its entirety.

BACKGROUND

Field of the Disclosure

The present disclosure relates to display devices, and may be directly or indirectly applied to an apparatus for compensating viewing angles of display devices and a method thereof.

Description of the Background

One of the elements for evaluating the performance of display devices is the "viewing angle." While there are varying degrees depending on the product, when users view the screen, there may be differences between what is seen from the front versus from the side. While clear image quality may be seen from the front view, when viewed from the side or from above, the screen appears darker or has more muted colors compared to the front view. When viewing a display screen, the angle at which image quality may be viewed without distortion is called the viewing angle.

Generally, since light travels in a straight line, displays that implement screens through light are also affected by brightness and color variations depending on the viewing angle.

For example, a liquid crystal display (LCD) has a structure where light from the backlight passes through liquid crystal and color filter, which results in viewing angle limitations. Therefore, a solution to solve these problems is required.

SUMMARY

Accordingly, the present disclosure is directed to an apparatus for compensating viewing angles of display devices and a method thereof that substantially obviate one or more of problems due to limitations and disadvantages described above.

Mor specially, the present disclosure seeks to solve the problem of degraded viewing angle performance in display devices such as LCD.

The present disclosure is also to provide a system that may generate at least one lookup tables using characteristics where viewing angles are good in low gray level and high gray level gamma, and compensate for viewing angles.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a method for compensating a viewing angle of a display device includes setting a luminance for each pixel of a display panel to a target luminance, wherein the target luminance includes a low gray level target luminance having a low gray level range and a high gray level target luminance having a high gray level range in the each pixel; referring to a lookup table including the low gray level target luminance and the high level target luminance which corresponds entire gray level values of an input image data input to the display panel, respectively; calculating a compensation value which corresponds to at least one of the 1 the low gray level target luminance and the high level target luminance corresponding to the input image data for the each pixel of the display panel referring to the lookup table; and compensating the viewing angle corresponding to the each pixel of the display panel referring to the compensation value for the input image data.

The compensation value is obtained using a first luminance difference value between the luminance of the input image data and the low gray level target luminance, or a second luminance difference value between the luminance of the input image data and the high gray level target luminance for the each pixel of the display panel.

The compensation value is obtained using a third luminance difference value and a fourth luminance difference value by applying a gain to the first luminance difference value and the second luminance difference value.

The method, between the setting the target luminance and the referring to the lookup table, further may include applying a weight to the target luminance, the low gray level target luminance, and the high gray level target luminance for the each pixel of the display panel, thereby changing at least one of a difference between the target luminance and the low gray level target luminance and the difference between the target luminance and the high gray level target luminance at a same gray level according to a position of the each pixel of the display panel. The lookup table may include the target luminance, the low-gray target luminance, and the high-gray target luminance to which the weight is respectively applied.

The lookup table may include a first lookup table generated by matching an entire grayscale value of input image data input to the display panel to the low gray level target luminance; and a second lookup table generated by matching the entire grayscale value of the input image data to the high grayscale target luminance.

The method, between the setting the target luminance and the referring to the lookup table, further may include calculating a maximum value of the low gray level target luminance based on the target luminance and the low gray level target luminance for the each pixel of the display panel.

The maximum value of the low gray level target luminance may be the largest value in the first lookup table.

The method, between the calculating the maximum value of the low gray level target luminance and the referring to the lookup table, further may include applying a roll-off algorithm to the maximum value of the low gray level target luminance for the each pixel of the display panel.

The method, between the calculating the maximum value of the low gray level target luminance and the generating the lookup table, further may include calculating a high gray level target luminance using the low gray level target luminance for the each pixel of the display panel.

The method, between the calculating the maximum value of the high gray level target luminance and the generating the lookup table, further may include calculating an inverse function value using the low gray level target luminance and the high gray level target luminance for the each pixel of the display panel.

The method, after the calculating the inverse function value, further may include calculating a first index/second index using the inverse function of the low gray level target luminance and the high gray level target luminance.

In another aspect of the present disclosure, an apparatus for compensating a viewing angle of a display device according to an aspect of the present disclosure includes a first processer configured to calculate target information by applying a weight to target luminance for each pixel of a display panel and refers to at least one lookup table based on the target information; and a second processor configured to calculate, for each pixel of the display panel, a target luminance value corresponding to an input image data input to the display panel by referring to the at least one lookup table, calculate a first luminance difference value between the luminance of the input image data and the target luminance, and supply a second luminance difference value calculated by applying a gain to the luminance difference value to each pixel of the display panel.

The target luminance may include a low gray level target luminance having a low gray level range and a high gray level target luminance having a high gray level range in the each pixel. The first processer may calculate a maximum value of the low gray level target luminance based on the target luminance and the low gray level target luminance for the each pixel of the display panel.

The target luminance may include a low gray level target luminance having a low gray level range and a high gray level target luminance having a high gray level range in the each pixel. The first processer may apply a weight to the target luminance, the low gray level target luminance, and the high gray level target luminance for the each pixel of the display panel, thereby changing at least one of a difference between the target luminance and the low gray level target luminance and the difference between the target luminance and the high gray level target luminance at a same gray level according to a position of the each pixel of the display panel.

The target luminance may include a low gray level target luminance having a low gray level range and a high gray level target luminance having a high gray level range in the each pixel. The at least lookup table may include a first lookup table generated by matching an entire grayscale value of input image data input to the display panel to the low gray level target luminance; and a second lookup table generated by matching the entire grayscale value of the input image data to the high grayscale target luminance.

The maximum value of the low gray level target luminance may be the largest value in the first lookup table.

The first processer may apply a roll-off algorithm to the maximum value of the low gray level target luminance for the each pixel of the display panel.

The first processer may calculate a high gray level target luminance using the low gray level target luminance for the each pixel of the display panel.

The first processer may calculate an inverse function value using the low gray level target luminance and the high-grayscale target luminance for the each pixel of the display panel.

The second processer may calculate a first index/second index using the inverse function of the low gray level target luminance and the high gray level target luminance.

First, according to an aspect of the present disclosure, there is a technical effect of improving the viewing angle of display devices. For example, the advantageous effects are maximized when applied to VA (Vertical Align) panels among LCDs.

Furthermore, according to an aspect of the present disclosure, by analyzing image data and setting different gains for each pixel, the problem of zigzag patterns occurring in edge areas may also be solved.

Furthermore, according to another aspect of the present disclosure, there are additional technical effects not mentioned here. Those skilled in the art may understand through the entire purport of the specification and drawings.

BRIEF DESCRIPTION OF THE DRAWINGS

The above and other features and advantages of the present disclosure will become more apparent to those of ordinary skill in the art by describing exemplary embodiments thereof in detail with reference to the attached drawings, in which:

FIG. 9 is a graph experimentally demonstrating that there is no difference in gamma curves when comparing an aspect of the present disclosure with conventional technology; and.

DETAILED DESCRIPTION

Hereinafter, while explaining in detail the embodiments disclosed in this specification with reference to the attached drawings, the same reference numbers will be assigned to identical or similar components regardless of their drawing reference numbers, and redundant explanations thereof will be omitted. The suffixes “module” and “part” used for components in the following description are assigned or used interchangeably only considering the ease of writing the specification, and do not have their own distinguishing meanings or roles. Also, in explaining the embodiments disclosed in this specification, when it is determined that detailed descriptions of related known technologies may obscure the gist of the embodiments disclosed in this specification, such detailed descriptions will be omitted. Also, the attached drawings are merely to help easily understand the embodiments disclosed in this specification, and it should be noted that the technical ideas disclosed in this specification should not be interpreted as being limited by the attached drawings.

Furthermore, while explaining about each drawing for convenience of explanation, it is also within the scope of rights of the present disclosure for those skilled in the art to implement other embodiments by combining two drawings.

Also, when it is mentioned that elements such as layers, regions, or substrates exist "on" other components, it may be understood that they may exist directly on other elements or intermediate elements may exist between them.

FIGS. 1A to 1F illustrate various panel structures of display devices.

Display devices are classified into emissive type and non-emissive type. Examples of emissive type display devices include CRT, PDP, LED (OLED, AMOLED), etc., and the representative example of non-emissive type display devices is LCD.

LCD displays images by utilizing optical refraction changes that occur by applying electrical voltage to alter the alignment of liquid crystal molecules, where the liquid crystal is injected and arranged between two glass plates.

Furthermore, IPS (In-Plane Switching) panels and VA (Vertical Alignment) panels, etc. are used as LCD panels.

Figure 1A:
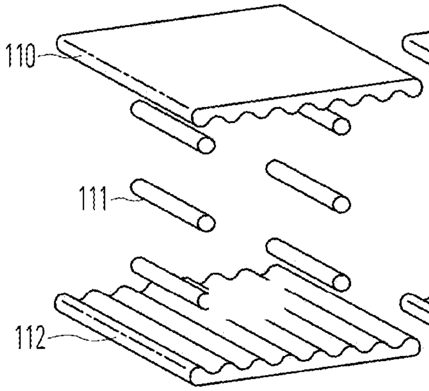
FIGS. 1A to 1F illustrate various panel structures of display devices.
Figure 1B:
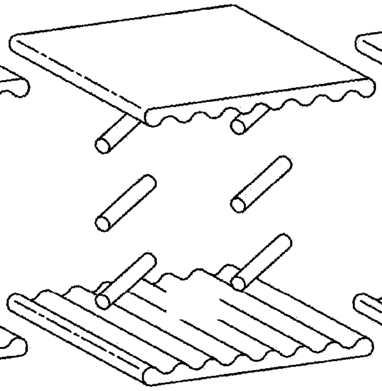
Figure 1C:
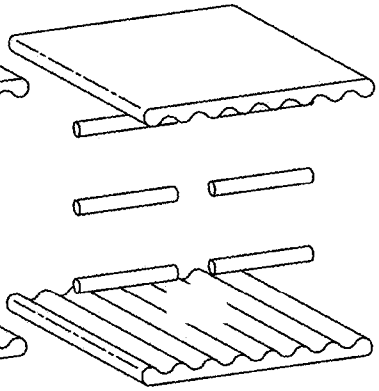

FIGS. 1A, 1B and 1C are about IPS panels, where FIG. 1A indicates power-off state (dark screen), FIG. 1B indicates the state when medium level voltage is applied, and FIG. 1C indicates the state when maximum voltage is applied (bright screen). Reference numerals 110 and 112 shown in FIGS. 1A to 1F represent electrodes, and reference numerals 111 shown in FIGS. 1A to 1F represents liquid crystal molecules.

As illustrated in FIGS. 1A, 1B and 1C, in an IPS panel, the liquid crystal molecules 111, which are initially arranged in a horizontal alignment, rotate while maintaining their horizontal orientation in response to applied voltage.

Figure 1D:
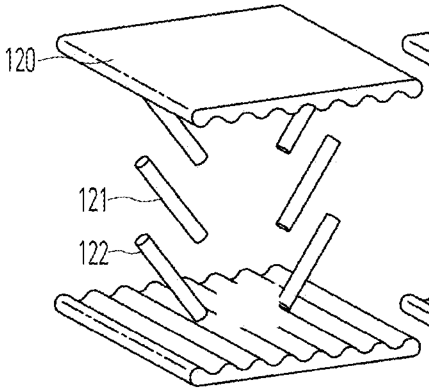
Figure 1E:
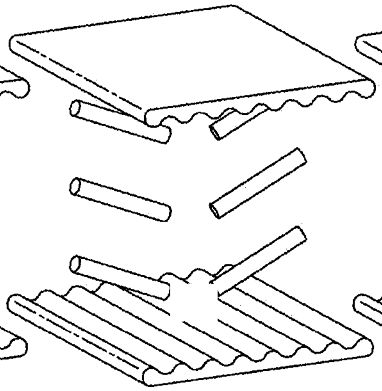
Figure 1F:
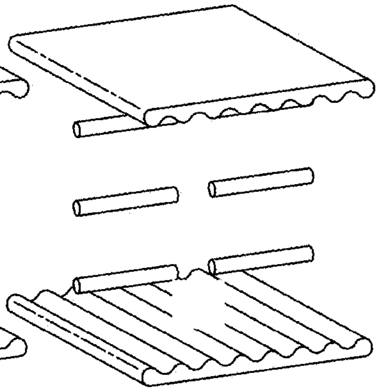

Meanwhile, FIGS. 1D, 1E and 1F are about VA panels, where FIG. 1D indicates power-off state (dark screen), FIG. 1E indicates the state when medium level voltage is applied, and FIG. 1F indicates the state when maximum voltage is applied (bright screen). Reference numerals 120 and 122 shown in FIGS. 1A to 1F represent electrodes, and reference numerals 121 shown in FIGS. 1A to 1F represents liquid crystal molecules.

In VA panels, as shown in FIGS. 1D, 1E and 1F, liquid crystal molecules 121 change to horizontal state from a state where the liquid crystal molecules 121 are vertically aligned according to power supply.

However, while VA panels have the advantage of improved contrast ratio compared to IPS panels, they have the limitation of relatively narrow viewing angle compared to IPS panels.

The present disclosure is proposed to improve viewing angle performance in LCD VA panels, focusing on such problems. However, while LCD VA panels are exemplified for convenience of explanation, the present disclosure may be applied to other display devices as well.

Figure 2:
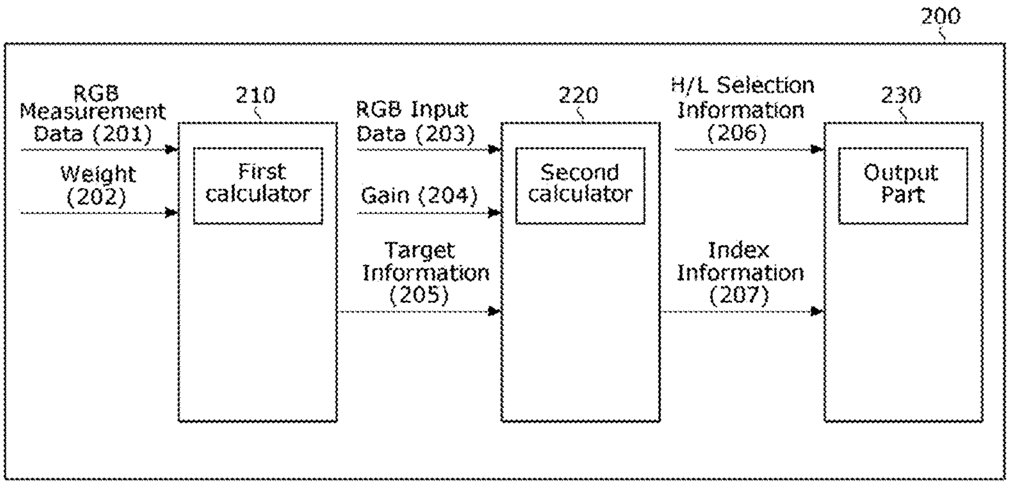
FIG. 2 schematically illustrates an apparatus for compensating a viewing angle of a display device according to an aspect of the present disclosure.

FIG. 2 schematically illustrates an apparatus for compensating a viewing angle of a display device according to an aspect of the present disclosure.

An aspect of the present disclosure proposes a new algorithm that may generate lookup tables (LUT) using characteristics where a viewing angle is good in low/high gray level gamma and automatically compensate for the viewing angle, to complement the drawback of degraded viewing angle performance in LCD VA panels.

Furthermore, another feature of the present disclosure is to adjust the intensity of the aforementioned automatic compensation algorithm or not apply it by analyzing images (saturation, edge, etc. of the image).

As shown in FIG. 2, the apparatus 200 for compensating a viewing angle of a display device according to an aspect of the present disclosure includes a first calculator 210, a second calculator 220, and an output unit 230. The first calculator 210 shown in FIG. 2 may be designed as software (SW) for example, and the second calculator 220 and output unit 230 may be designed as hardware (HW) for example, but the present disclosure is not necessarily limited thereto.

Furthermore, part or all of the apparatus 200 for compensating a viewing angle may be included inside the display device.

The first calculator 210 receives RGB measurement data 201 and weight 202. The RGB measurement data 201 may be, for example, a luminance value of a pixel corresponding to each position of a display panel. The weight 202 may be a value assigned so that all pixels within the display panel have a uniform value when there is a deviation in the luminance value of each pixel depending on the position of the display panel. The RGB measurement data 201 and the weight 202 may be provided at the factory initialization stage. The first calculator 210 may measure the luminance of the panel at at least one gray level, and apply a weight 202 to the RGB measurement data 201 to calculate target information 205 for each pixel of the measured display panel. The second calculator 220 may generate at least two lookup tables based on target information 205 (e.g., target luminance) corresponding to each pixel of the display panel. Each of the at least two lookup tables may include an input value (e.g., luminance value of the RGB input data 203) and an output value corresponding thereto (e.g., index information (207) for finding the target luminance value (205).

The second calculator 220 may receive the RGB input data 203, a gain 204, and the target information 205 from the first calculator 210. The gain 204 is a value provided to maintain uniform brightness and color of the entire display panel, and may be provided at the pixel correction or factory initialization stage, but may be dynamically adjusted through integrated control of software and hardware for the entire area or a specific area of the display panel. The second calculation unit 220 may detect luminance information corresponding to image data by referring to the at least two lookup tables.

The output unit 230 may receive H/L selection information 206 from a controller of the display panel and index information 207 of the lookup table. The H/L selection information 206 may provide an H/L signal (high signal, low signal) by setting a logic level in the controller. The output unit 230 may compensate and output the RGB input data 203 based on the index information 207 and the H/L selection information 206.

In an aspect of the present disclosure, at least one lookup table may include, for example, a first lookup table related to low gray level gamma characteristics and a second lookup table related to high gray level gamma characteristics. An aspect related thereto will be described in more detail later in FIGS. 4A to 4C.

In another aspect of the present disclosure, the sum of a first luminance value corresponding to a specific gray level stored in the first lookup table and a second luminance value corresponding to the specific gray level stored in the second lookup table is twice the target luminance value at the specific gray level. The aspect related to this will be described in more detail below in FIGS. 6A to 6C.

In another aspect of the present disclosure, it may also solve secondary problems arising from the automatic viewing angle compensation algorithm. by analyzing image data and not using multiple lookup tables according to the analysis results. The embodiment aspect related to this will be described in more detail below in FIGS. 6A to 6C.

In another aspect of the present disclosure will be described in more detail below in FIG. 8.

Figure 3:
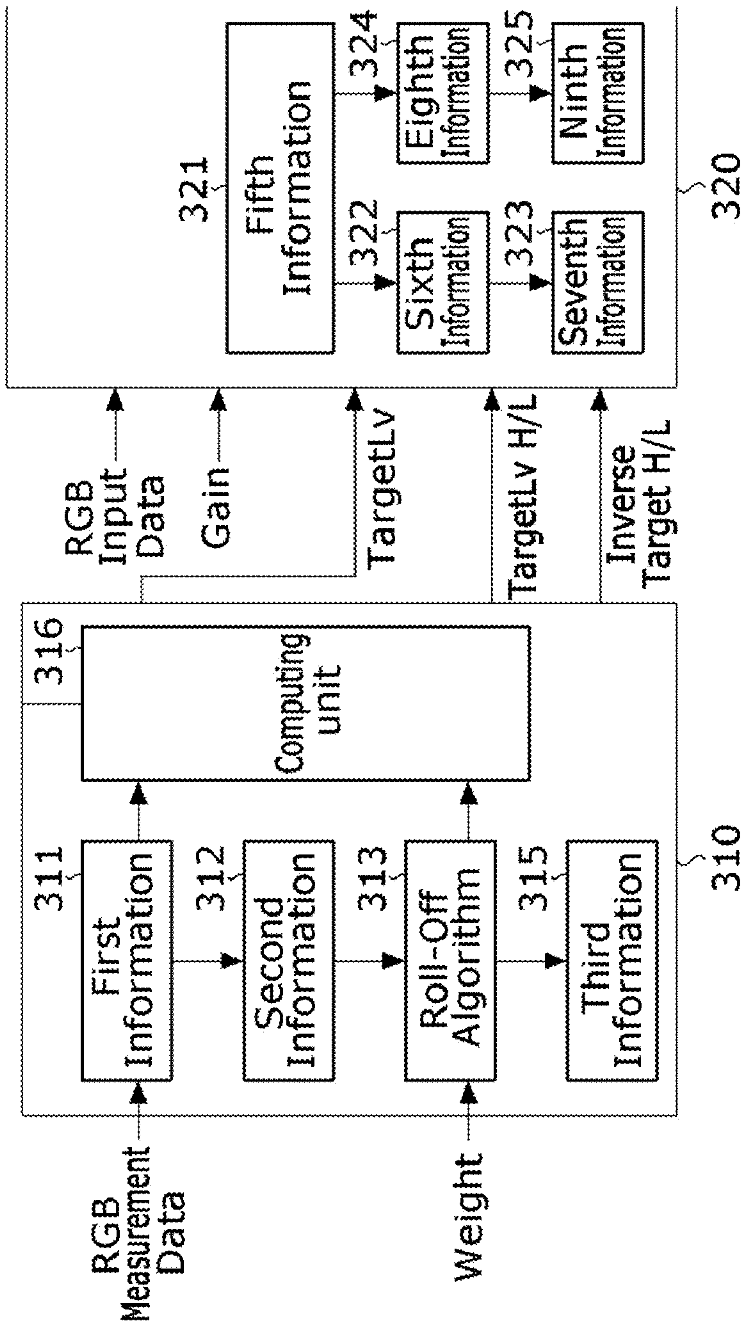
FIG. 3 illustrates in detail an apparatus for compensating a viewing angle of a display device according to an aspect of the present disclosure.

FIG. 3 illustrates in detail an apparatus for compensating a viewing angle of a display device according to an aspect of the present disclosure.

The first calculator 310 may set the luminance value of RGB measurement data for each pixel of the panel as the first information 311. The first calculator 310 may calculate the maximum value (TargetLv Low Max) of the low gray level target luminance among the luminance values of the RGB measurement data as the second information 312, and apply, for example, a roll off algorithm 313 to the maximum value (TargetLv Low Max) of the low gray level target luminance to control the luminance change in the low-gray area more smoothly and naturally.

The first calculator 310 may apply a weight (VWC Weight) that may adjust the compensation strength for distortion that may occur depending on the viewing angle to the second information 312 to which the roll-off algorithm 313 is applied, thereby generating the high-gray/low-gray target luminance (TargetLv H/L) as the third information 315.

Furthermore, the computing unit 316 of the first calculator 310 may generate the first lookup table related to low gray level gamma characteristics and the second lookup table related to high gray level gamma characteristics, (H/L LUT), by mapping each value using target luminance (TargetLv) and high/low gray level target luminance (TargetLv H/L).

The second calculator 320 may calculate the fifth information 321 by applying gain and target luminance value (TargetLv) to RGB input data, calculate the sixth information 322 by applying high gray level/low gray level target luminance data (TargetLv H/L data) to the fifth information 321, and calculate the H index (H Index), which is an example of the seventh information 323 by using the inverse function value (Inverse Target H), which is an example of the sixth information 322. Furthermore, it calculates L index, which is an example of ninth information 325, using inverse function value (Inverse Target L), which is an example of eighth information 324.

The output unit 330 may determine gray values that should be displayed in each pixel using the lookup tables, which is an example of tenth information 326 generated by the first calculator 310, and H/L index, which is an example of eleventh information 327 generated by the second calculator 320. And, according to H/L selection information, which is an example of twelfth information 328, it outputs either H data or L data for each sub-pixel.

The entire process described above will be explained more specifically step by step with reference to other drawings.

Step 1: Measuring RGB Luminance of Panel

In step 1, RGB luminance (in other words, Luminance, Lv) is measured for each pixel of the display panel. The RGB luminance may be the pixel luminance value shipped from the factory, and if the manufacturer provides information on RGB luminance, separate luminance measurement may not be necessary. Because luminance before and after applying the viewing angle compensation algorithm according to an aspect of the present disclosure should be almost identical, the measured RGB luminance is defined herein as target luminance (TargetLv).

Step 2: Calculating Low Gray level Target Luminance

In step 2, a low gray level target luminance (TargetLv Low) is calculated based on the target luminance (TargetLv).

As mentioned above, because the viewing angle is good in both low gray level gamma and high gray level gamma, low gray level target luminance (TargetLv Low) of all gray levels (for example, 0-255) that may reflect the above mentioned characteristic is generated.

Figure 4C:
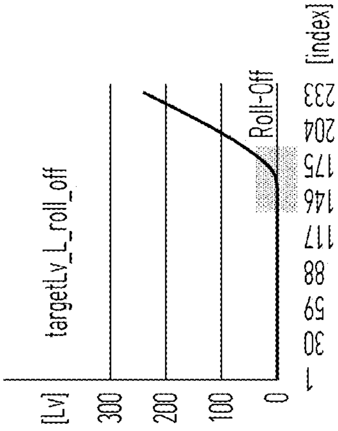
FIGS. 4A to 4C are drawings for explaining a process of setting target luminance according to an aspect of the present disclosure.
Figure 4B:
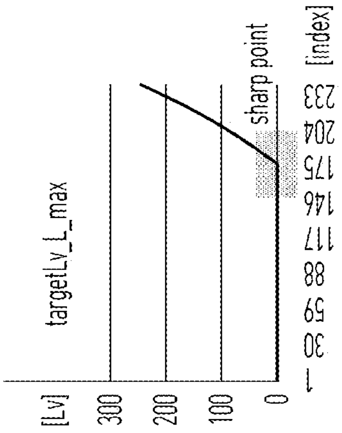
Figure 4A:
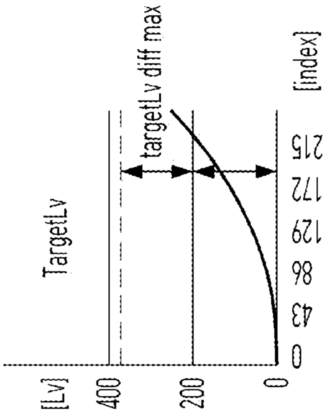

As shown in FIG. 4A, the maximum value of low gray level target luminance (TargetLv Low Max) is calculated. The maximum value of low gray level target luminance (TargetLv Low Max) is obtained through the following equation, for example:

$$TargetLv\text{ Low Max} = TargetLv - TargetLv\ diff\text{ max.}$$

Here, target maximum value (TargetLv diff max) of the low gray level target luminance means the largest value among the possible differences between target luminance (TargetLv) and low gray level target luminance (TargetLv Low).

However, when designed this way, as shown in FIG. 4B, a sharp point occurs at the maximum value of low gray level target luminance (TargetLv Low Max).

The sharp point occurs when the difference between targetLv[index] and (targetLv[255]−targetLv[index]) is smallest. In the ideal case, the above index becomes 186 gray.

To solve this problem, by applying a roll-off algorithm to the maximum value of low gray level target luminance (TargetLv Low Max), for example, it is changed to a smooth curve as shown in FIG. 4C. At this time, a quadratic function such as $y=a*(x-b)^2$ may be used (where a and b are both constants).

Also, the overall viewing angle performance may be adjusted by varying the spacing between the target luminance graph, the low gray level target luminance graph, and the high gray level target luminance graph. To implement this, weight information is utilized according to the following equation:

$$TargetLv\text{ Low} = TargetLv*(1-\text{weight}) + TargetLv\text{ Low Roll Off}*\text{weight.}$$

Here, the weight may have a range from 0 to 1, and adjusting the weight provides a technical effect that enables the adaptive modification of the viewing angle compensation intensity.

Figure 5A:
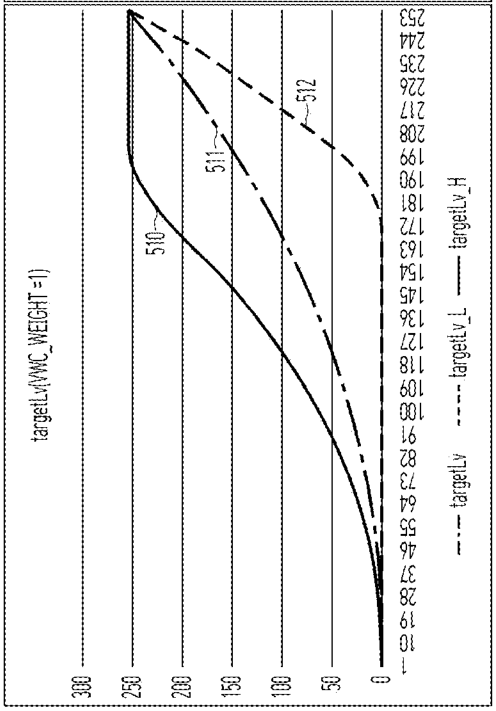
FIGS. 5A to 5B are diagrams for explaining a process of applying weight according to an aspect of the present disclosure.
Figure 5B:
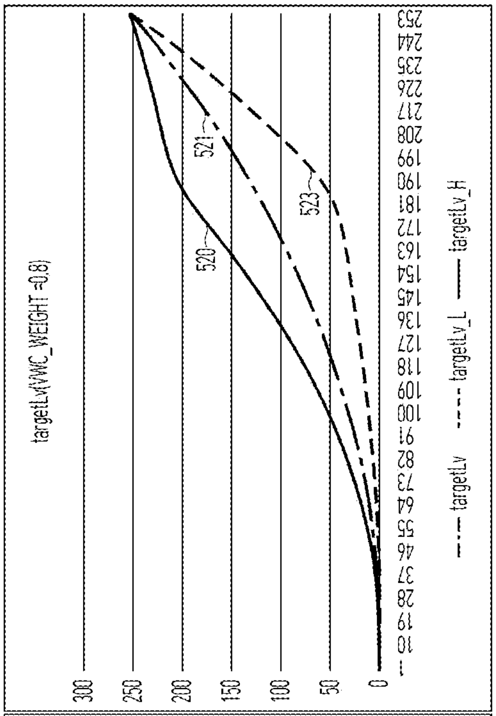

FIG. 5A shows the case where the weight is set to 1, and FIG. 5B shows the case where the weight is set to 0.8.

As illustrated in FIG. 5A, setting the weight to 1 results in significant divergence between the target luminance graph 511, the low gray level target luminance graph 512, and the high gray level target luminance graph 510. The viewing angle performance is further improved as the low gray level target luminance graph 512 diverges toward the low gray level value while the high gray level target luminance graph 510 diverges toward the high gray level value.

However, while viewing angle performance improves as the weight increases, because the difference between low gray level target luminance and high gray level target luminance becomes larger, there may be differences from the original target luminance when viewed from the front of the display device.

Considering this trade-off limitation, as shown in FIG. 5B, when the weight is set to, for example, 0.8, there is appropriate spacing between the target luminance graph 521, the low gray level target luminance graph 523, and the high gray level target luminance graph 520. As a result, there is minimal deviation from the original target luminance when viewed from the front of the display device while achieving the technical effect of improved viewing angle performance from the side view of the display device.

Meanwhile, using low gray level target luminance (TargetLv Low), high gray level target luminance (TargetLv High) that reflects high gray level gamma characteristics is calculated.

The high gray level target luminance (TargetLv High) may obtain according to the following equation:

$$TargetLv\ \text{High} = 2 * TargetLv - TargetLv\ \text{Low}.$$

And, inverse function values (Inverse Target Low, High) may be calculated using low gray level target luminance (TargetLv Low) and high gray level target luminance (TargetLv High).

Step 3: Generating Lookup Tables

In step 3, lookup tables may be generated respectively for the low gray level target luminance (TargetLv Low) and high gray level target luminance (TargetLv High) calculated in the second step.

Figures 6A, 6B:
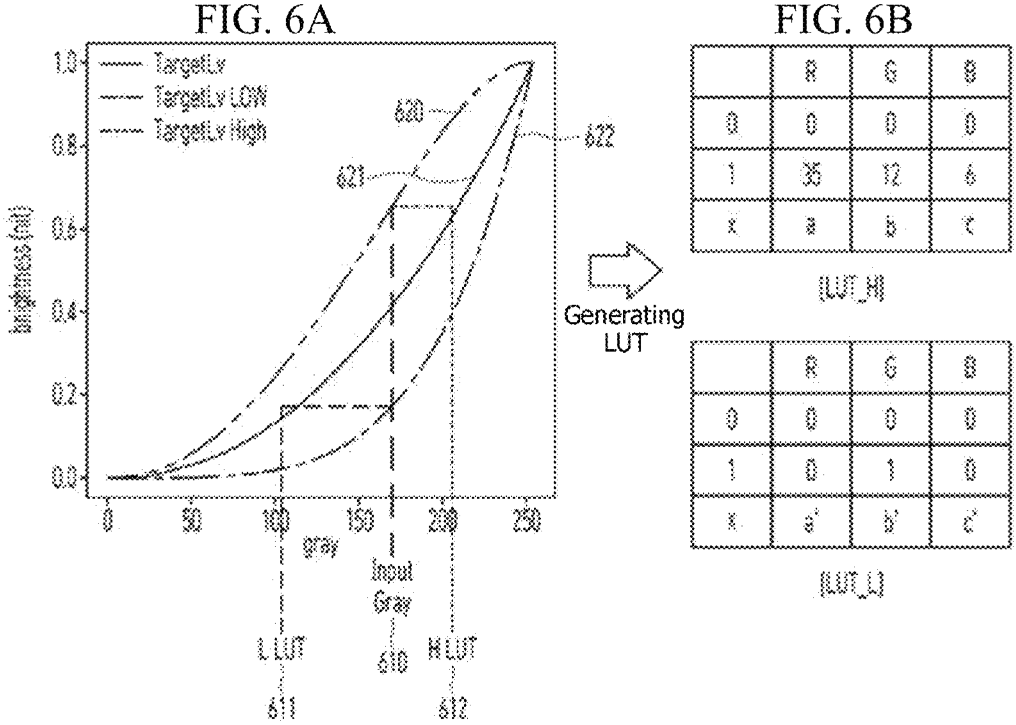
FIGS. 6A to 6B are drawings for explaining a process of generating multiple lookup tables according to an aspect of the present disclosure.

In FIG. 6A, reference numeral 621 indicates the target luminance graph, reference numeral 622 indicates the low gray level target luminance graph, and reference numeral 620 indicates the high gray level target luminance graph.

In this case, when the input gray value 610 of the RGB input data is 170, the corresponding value 612 in the high gray level target luminance graph 620 is 210. By repeating this process for all gray levels, a lookup table related to high gray level gamma characteristics is generated as shown in the upper part of FIG. 6B.

And, when the input gray value 610 of the RGB input data is 170, the corresponding value 611 in the low gray level target luminance graph 622 is 105. By repeating this process for all gray levels, a lookup table related to low gray level gamma characteristics is generated as shown in the lower part of FIG. 6B.

According to an aspect of the present disclosure, there is an additional advantage of improved processing speed because lookup tables are automatically generated by software.

And, when managing lookup tables manually as in conventional technology, there is a problem that not only overall viewing angle intensity may not be adjusted, but it is also difficult to additionally adjust gain for each pixel.

Step 4: H/L Index Calculation

The aforementioned first through third embodiments are about the process of automatically generating lookup tables.

The step 4 relates to the process of calculating target luminance data that pixels should represent when input RGB data is received.

In the step 4, final luminance values mapped in the lookup table are determined using H/L index.

Figure 7:
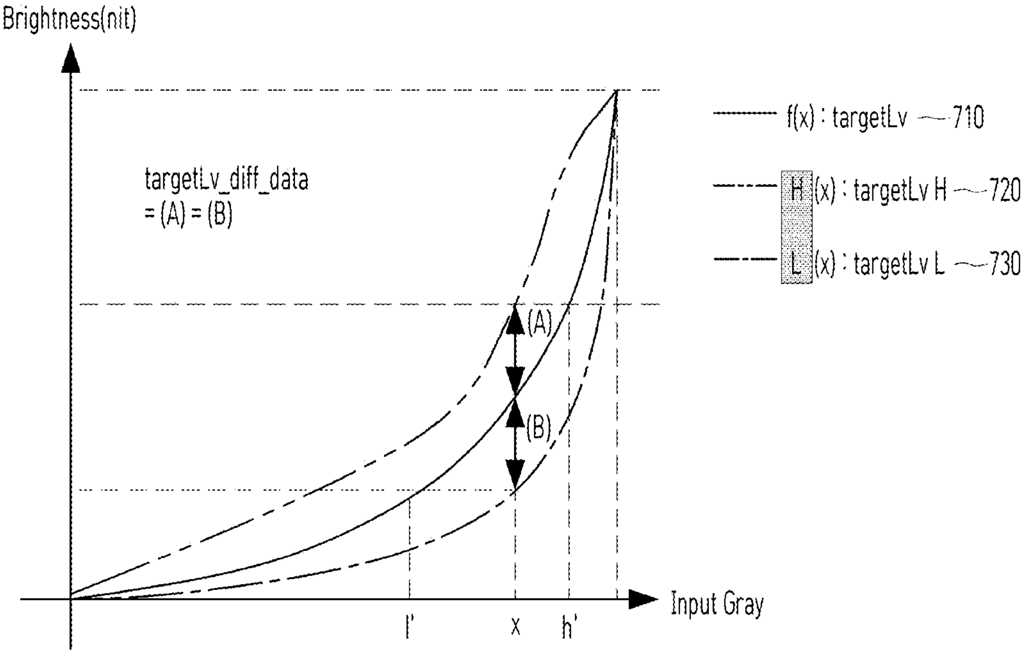
FIG. 7 is a drawing for explaining a process of detecting brightness information corresponding to input image data according to an aspect of the present disclosure.

First, target luminance value (targetLv_data) corresponding to input RGB data (x) is calculated from the target luminance graph 710 shown in FIG. 7. This may be done for each RGB pixel of the display panel, which may be expressed in equation as follows:

$$\text{targetLv\_data}=(x).$$

Secondly, using the input RGB data and the target luminance difference value (TargetLv Diff=TargetLv−TargetLv Low), the spacing between the target luminance (TargetLv) and the low/high gray level target luminance (TargetLv L/H) is calculated for each pixel. This may be expressed by the following equation:

$$\text{targetLv\_diff\_data} = ((x) - L(x)) \text{ or } (H(x) - f(x)).$$

Here, f(x) means the target luminance graph 710 shown in FIG. 7, H(x) means the high gray level target luminance graph 720 shown in FIG. 7, and L(x) means the low gray level target luminance graph 730 shown in FIG. 7.

Third, target luminance difference value with gain applied is calculated for each pixel. This may be expressed in equation as follows:

$$\text{targetLv\_diff\_gain\_data} = \text{gain} * \text{max target } diff$$

Here, the gain may have a value between 0 and 1, and allows adaptive adjustment of viewing angle intensity for each pixel according to the state of image data such as saturation, edge, etc.

Particularly, according to an aspect of the present disclosure, the aforementioned viewing angle compensation algorithm is not applied in the edge portions of image data. This is designed to exclude the possibility of zigzag patterns being recognized in that area when the user is close to the display device.

Fourth, luminance values L(l') and H(h') that each pixel should have are calculated through the following equations. L(l') may be named as targetLv_L_data, and H(h') may be named as targetLv_H_data.

$$L(l') = f(x) - \text{gain} * (f(x) - L(x))$$

$$H(h') = f(x) + \text{gain} * (H(x) - f(x)).$$

Fifth, the H/L index is determined using inverse functions of L(x) and H(x). Here, the H/L index means l' and h' in the equation below.

$$l' = L^{-1}(f(x) - \text{gain} * (f(x) - L(x)))$$

$$h' = H^{-1}(f(x) + \text{gain} * (H(x) - f(x)))$$

Step 5: H/L Data Output

In the step 5, using the lookup tables obtained from the step 3 and indices (l' and h') obtained from the step 4, gray values that each pixel should display are calculated.

More specifically, for example, it is assumed using the lookup table related to high gray level gamma characteristics shown in the upper part of FIG. 6B. When index is 1, R pixel's gray value corresponds to 35, G pixel's gray value corresponds to 12, and B pixel's gray value corresponds to 6. Each gray value may be named as RGB H data.

Meanwhile, it is assumed the lookup table is used to relate to low gray level gamma characteristics shown in the lower part of FIG. 6B. When index is 1, R pixel's gray value corresponds to 0, G pixel's gray value corresponds to 1, and B pixel's gray value corresponds to 0. Each gray value may be named as RGB L data.

Figure 8:
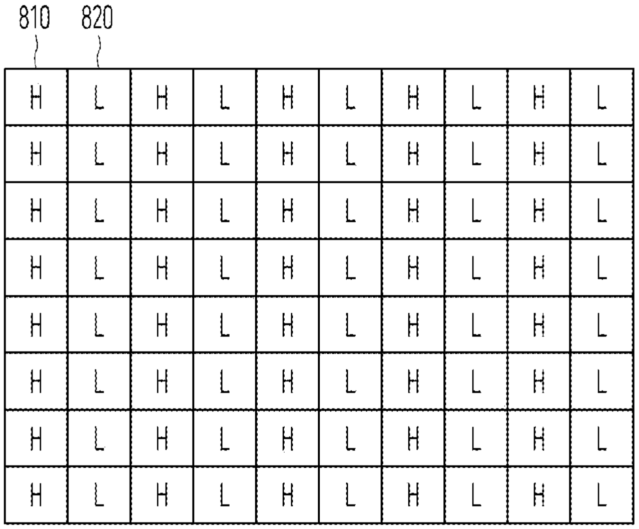
FIG. 8 is a drawing for explaining pixel-by-pixel patterns according to an aspect of the present disclosure.

Since there is H/L data for each pixel, it needs to be decided which of H/L to select for each pixel position, and for this purpose, as shown in FIG. 8, pixels 810 corresponding to H data and pixels 820 corresponding to L data by pixel position must be predefined in a memory.

And, when either H data or L data is selected according to the pattern shown in FIG. 8, gray values that each pixel should display may be finally output.

Figure 9:
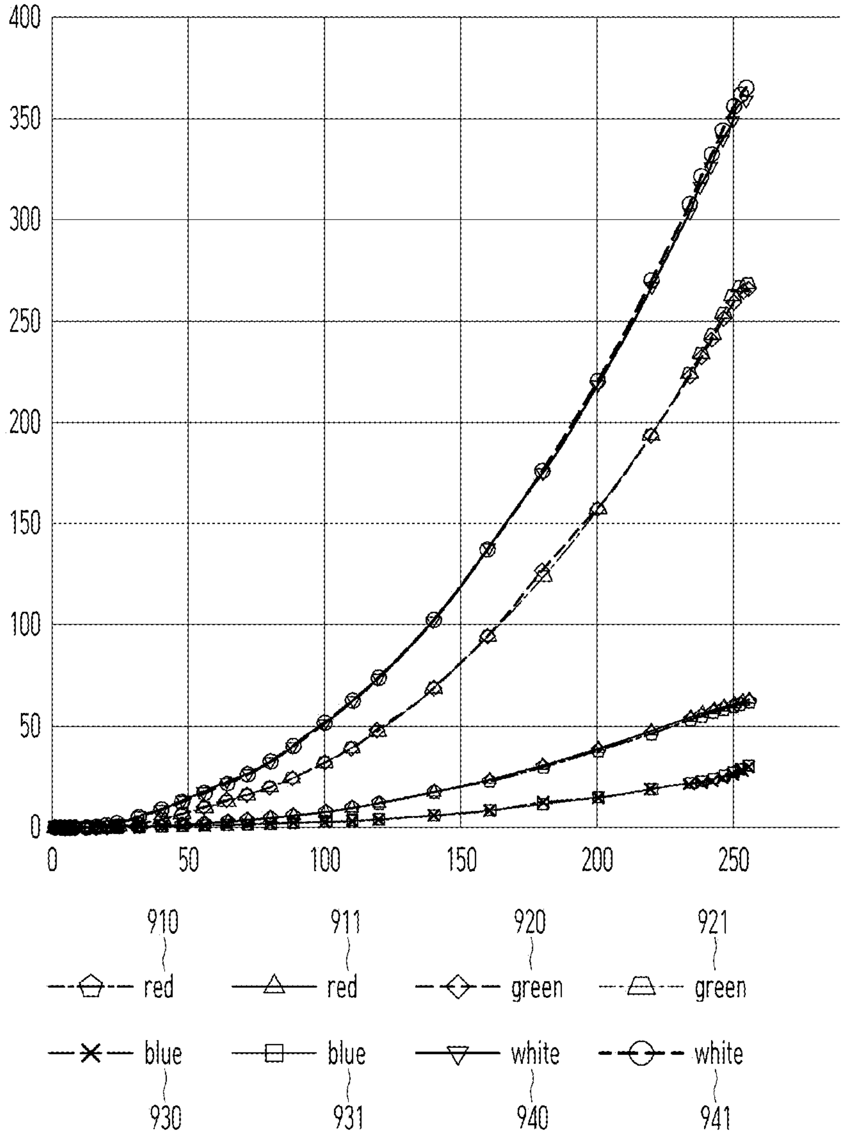

FIG. 9 is a graph experimentally demonstrating that there is no difference in gamma curves when comparing the aspect of the present disclosure with conventional technology.

As shown in FIG. 9, it may be seen that the gamma characteristic graph of red pixel 910 according to conventional technology and the gamma characteristic graph of red pixel 911 according to the aspect of the present disclosure are almost identical.

Furthermore, as shown in FIG. 9, it may be seen that the gamma characteristic graph of green pixel 920 according to conventional technology and the gamma characteristic graph of green pixel 921 according to the aspect of the present disclosure are almost identical.

Also, as shown in FIG. 9, it may be seen that the gamma characteristic graph of blue pixel 930 according to conventional technology and the gamma characteristic graph of blue pixel 931 according to the aspect of the present disclosure are almost identical.

And, as shown in FIG. 9, it may be seen that the gamma characteristic graph of white pixel 940 according to conventional technology and the gamma characteristic graph of white pixel 941 according to the aspect of the present disclosure are almost identical.

Therefore, it has been experimentally demonstrated that although the viewing angle is expanded according to the aspect of the present disclosure, gamma characteristics do not change when users view the display device from the front.

Meanwhile, those skilled in the art may recognize from FIG. 10 below that the viewing angle from the side has been improved.

Figure 10A:
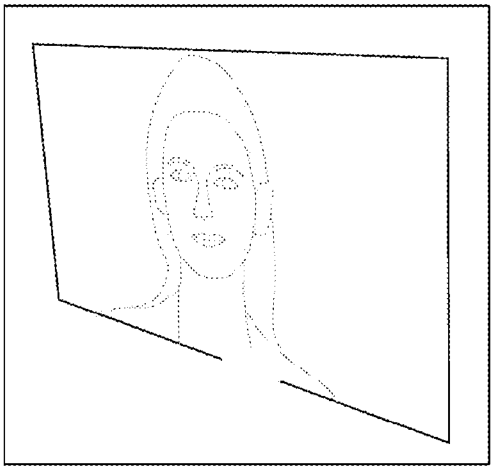
FIGS. 10A and 10B illustrate images showing an improved viewing angle from the side view when comparing an aspect of the present disclosure with conventional technology.

That is, FIG. 10A shows that according to conventional technology, when users view the display device from the side, particularly the color of white face image data appears pale as color is lost.

Figure 10B:
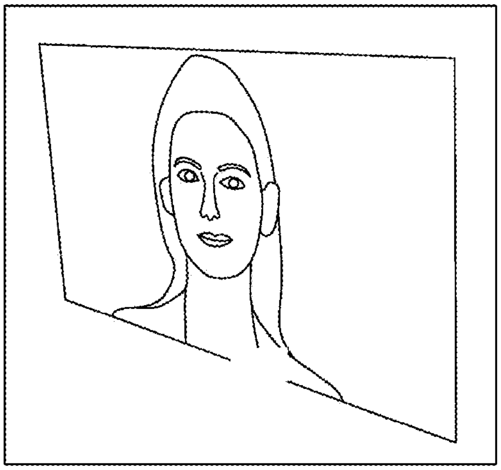

On the other hand, FIG. 10B shows that according to an aspect of the present disclosure, even when a user views the display device from the side, particularly the color of white face image data does not appear pale, and the original white color is reproduced almost as is.

The above description is merely exemplary explanation of the technical ideas of the present disclosure, and those skilled in the art in the technical field to which the present disclosure belongs could make various modifications and variations within the scope not departing from the essential characteristics of the present disclosure.

Therefore, the embodiments disclosed in the present disclosure are not to limit but to explain the technical ideas of the present disclosure, and the scope of the technical ideas of the present disclosure is not limited by such embodiments.

The scope of protection of the present disclosure should be interpreted by the claims below, and all technical ideas within equivalent scope should be interpreted as being included in the scope of rights of the present disclosure.

What is claimed is:

1. A method for compensating a viewing angle of a display device, comprising:

setting a luminance for each pixel of a display panel to a target luminance, wherein the target luminance includes a low gray level target luminance having a low gray level range and a high gray level target luminance having a high gray level range in the each pixel;

referring to a lookup table including the low gray level target luminance and the high level target luminance which respectively corresponds entire gray level values of an input image data input to the display panel;

calculating a compensation value which corresponds to at least one of the low gray level target luminance and the high level target luminance corresponding to the input image data for the each pixel of the display panel referring to the lookup table; and compensating the viewing angle corresponding to the each pixel of the display panel referring to the compensation value for the input image data, wherein the lookup table includes:

a first lookup table generated by matching an entire grayscale value of input image data input to the display panel to the low gray level target luminance; and a second lookup table generated by matching the entire grayscale value of the input image data to the high grayscale target luminance.

2. The method according to claim 1, wherein the compensation value is obtained using a first luminance difference value between the luminance of the input image data and the low gray level target luminance, or a second luminance difference value between the luminance of the input image data and the high gray level target luminance for the each pixel of the display panel.

3. The method according to claim 2, wherein the compensation value is obtained using a third luminance difference value and a fourth luminance difference value by applying a gain to the first luminance difference value and the second luminance difference value.

4. The method according to claim 1, between the setting the target luminance and the referring to the lookup table, further comprising: applying a weight to the target luminance, the low gray level target luminance, and the high gray level target luminance for the each pixel of the display panel, thereby changing at least one of a difference between the target luminance and the low gray level target luminance and the difference between the target luminance and the high gray level target luminance at a same gray level according to a position of the each pixel of the display panel, wherein the lookup table includes the target luminance, the low-gray target luminance, and the high-gray target luminance to which the weight is respectively applied.

5. The method according to claim 4, between the setting the target luminance and the referring to the lookup table, further comprising: calculating a maximum value of the low gray level target luminance based on the target luminance and the low gray level target luminance for the each pixel of the display panel.

6. The method according to claim 5, wherein the maximum value of the low gray level target luminance is the largest value in the first lookup table.

7. The method according to claim 5, between the calculating the maximum value of the low gray level target luminance and the generating the lookup table, further comprising: applying a roll-off algorithm to the maximum value of the low gray level target luminance for the each pixel of the display panel.

8. The method according to claim 5, between the calculating the maximum value of the low gray level target luminance and the generating the lookup table, further comprising calculating a high gray level target luminance using the low gray level target luminance for the each pixel of the display panel.

9. The method according to claim 6, between the calculating the maximum value of the high gray level target luminance and the generating the lookup table, further comprising calculating an inverse function value using the low gray level target luminance and the high gray level target luminance for the each pixel of the display panel.

10. The method according to claim 9, further comprising calculating a first index/second index using the inverse function of the low gray level target luminance and the high gray level target luminance after the calculating the inverse function value.

11. An apparatus for compensating a viewing angle of a display device, comprising:

a first processer configured to calculate target information by applying a weight to target luminance for each pixel of a display panel and generate at least one lookup table based on the target information; and a second processor configured to calculate, for each pixel of the display panel, a target luminance value corresponding to an input image data input to the display panel by referring to the at least one lookup table, calculate a first luminance difference value between the luminance of the input image data and the target luminance, and supply a second luminance difference value calculated by applying a gain to the luminance difference value to each pixel of the display panel, wherein the target luminance includes a low gray level target luminance having a low gray level range and a high gray level target luminance having a high gray level range in the each pixel, and wherein the at least lookup table includes:

a first lookup table generated by matching an entire grayscale value of input image data input to the display panel to the low gray level target luminance; and a second lookup table generated by matching the entire grayscale value of the input image data to the high grayscale target luminance.

12. The apparatus according to claim 11, wherein the target luminance includes a low gray level target luminance having a low gray level range and a high gray level target luminance having a high gray level range in the each pixel, and the first processer calculates a maximum value of the low gray level target luminance based on the target luminance and the low gray level target luminance for the each pixel of the display panel.

13. The apparatus according to claim 11, wherein the target luminance includes a low gray level target luminance having a low gray level range and a high gray level target luminance having a high gray level range in the each pixel, and the first processer applies a weight to the target luminance, the low gray level target luminance, and the high gray level target luminance for the each pixel of the display panel, thereby changing at least one of a difference between the target luminance and the low gray level target luminance and the difference between the target luminance and the high gray level target luminance at a same gray level according to a position of the each pixel of the display panel.

14. The apparatus according to claim 12, wherein the maximum value of the low gray level target luminance is the largest value in the first lookup table.

15. The apparatus according to claim 12, wherein the first processer applies a roll-off algorithm to the maximum value of the low gray level target luminance for the each pixel of the display panel.

16. The apparatus according to claim 11, wherein the first processer calculates a high gray level target luminance using the low gray level target luminance for the each pixel of the display panel.

17. The apparatus according to claim 16, wherein the first processer calculates an inverse function value using the low gray level target luminance and the high gray level target luminance for the each pixel of the display panel.

18. The apparatus according to claim 17, wherein the second processer calculates a first index/second index using the inverse function of the low gray level target luminance and the high gray level target luminance.

* * * * *